L. C. KRUMMEL.
CAN HEADING MACHINE.
APPLICATION FILED NOV. 14, 1908.

941,346.

Patented Nov. 23, 1909.

Witnesses
Inventor
Louis C. Krummel
By Sturtevant & Mason
Attorneys

L. C. KRUMMEL.
CAN HEADING MACHINE.
APPLICATION FILED NOV. 14, 1908.

941,346.

Patented Nov. 23, 1909.
7 SHEETS—SHEET 6.

Witnesses
C. H. Walker
Mary W. Hammer

Inventor
Louis C. Krummel
By Sturtevant & Mason
Attorneys

UNITED STATES PATENT OFFICE.

LOUIS C. KRUMMEL, OF CLINTON, CONNECTICUT.

CAN-HEADING MACHINE.

941,346.     Specification of Letters Patent.     Patented Nov. 23, 1909.

Application filed November 14, 1908. Serial No. 462,629.

*To all whom it may concern:*

Be it known that I, LOUIS C. KRUMMEL, a citizen of the United States, residing at Clinton, in the county of Middlesex, State of Connecticut, have invented certain new and useful Improvements in Can-Heading Machines, of which the following is a description, reference being had to the accompanying drawing, and to the figures of reference marked thereon.

The invention relates to new and useful improvements in automatic mechanism for heading and closing cans, of the type wherein the head or top is placed on the can body and secured thereto solely by crimping and seaming, thus producing a sanitary can.

An object of the invention is to provide an apparatus wherein the cans are automatically fed over a stationary table to the heading and seaming mechanisms, and are held stationary during the heading and seaming operations, whereby all liability of spilling the contents of the can is avoided.

A further object of the invention is to provide an apparatus for heading and seaming cans, which includes a central post or stem, around which are located the various operating stations, and on which is supported an automatic feeding mechanism for delivering the cans first to one station and then to another.

A further object of the invention is to provide an apparatus of the above character, with a shaping mold, operating upon the can body at the heading station to properly round up the body of the can, so that it may properly receive the head or top.

A further object of the invention is to provide an apparatus for closing filled cans, which includes a stationary table having a smooth unbroken surface, over which the cans may be moved, whereby all pockets which may receive spilled syrup are avoided, thus producing sanitary conditions in the apparatus.

A further object of the invention is to provide a can seaming mechanism which includes a stationary table, on which the can rests during the entire closing operation, and on which the cans are held from rotating or moving in any way during the seaming operation.

A further object of the invention is to provide a can seaming mechanism of the above character, with a center pad which is moved toward and from the stationary table, and is so timed relatively to the movements of the seaming head as to eject the closed can from the seaming head.

These and other objects will in part be obvious, and will in part be hereinafter more fully described.

In the drawings, which show by way of illustration one embodiment of my invention, Fig. 18 is a sectional view through the seaming head, showing the seaming head withdrawn from the can.

In carrying out my invention, I have provided a central post 1, which extends upward from a supporting base 2, and around this central post I have arranged the various operating stations for securing the top or head to a can body, and have also provided an automatic feeding mechanism for feeding the cans one after another to the various operating stations.

As a means for supporting the cans during the various operations performed upon the same, I have provided a table 3, which is supported on suitable brackets carried by the post 1. The table 3, as herein shown, is stationary, and has its upper surface smooth and unbroken, and also free from all obstructions. It quite often occurs during the closing of a filled can that the syrup is spilled, and if the table on which the can rests is provided with pockets of any character, or with obstructions, the syrup lodges around these parts, and soon the entire apparatus becomes unsanitary. By my improved table, wherein the entire top is smooth and unbroken, the table may be quickly cleaned by wiping off and no pockets are formed in which syrup may lodge.

Figures 1, 4:
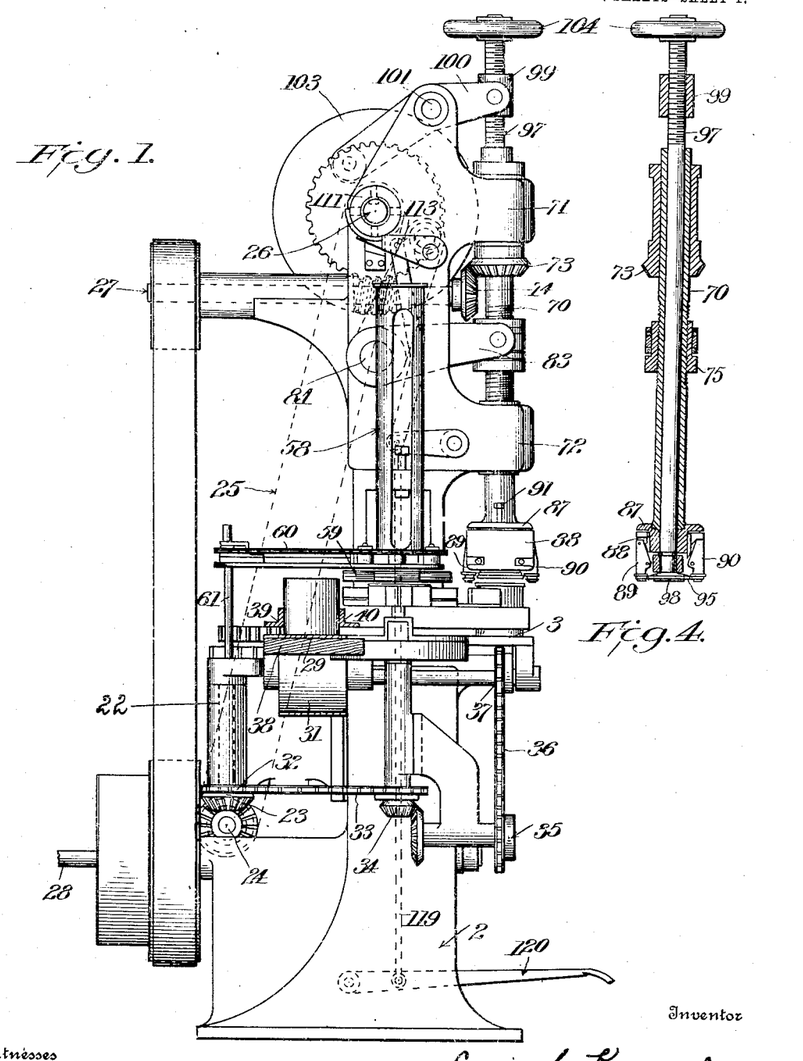
—Figure 1 is a side view of the entire apparatus.
Fig. 4 is a sectional view through the seaming head, the supporting spindle and the center rod.
Figures 2, 14:
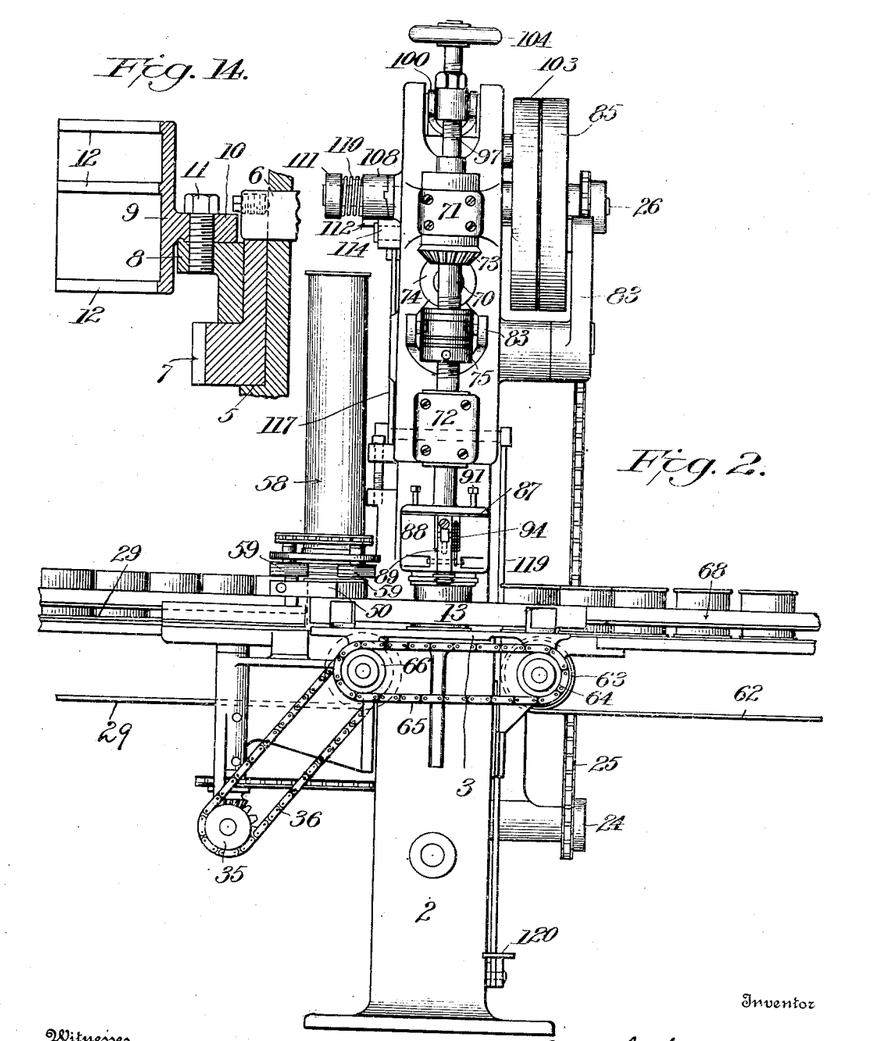
Fig. 2 is a front view of the same.
Fig. 14 is a detail sectional view, showing the manner of connecting the dial feed pockets to the feed dial, and the manner of supporting the feed dial.

As a means for conveying the cans across the table from one operating station to another, I have provided a feed dial 4, which surrounds the central post 1, (see Fig. 14). Said dial is mounted on a gear 7, which also surrounds the post 1 and rests on a seat 5, carried by said post, so that said dial and gear may rotate freely on said post. The dial and gear are held on their seat by a collar 6, which is secured to the post. The feed dial is provided with an outwardly extending flange 8, on which is detachably secured a plurality of spaced dial feed pockets 9. Each of the dial feed pockets 9, as shown in Fig. 14, is provided with a shank 10, through which passes a bolt 11, securing the pocket to the feed dial. The feed pocket, as herein shown, is shaped so as to conform to the outer surface of the can when the can is properly rounded up to receive its head. The feed pocket also extends to each side of its supporting shank, and is provided with ribs 12, which engage the can at different points throughout its height, so as to properly hold the can and move the same upon the stationary table, without in any way jamming the can. It will readily be seen, therefore, that these dial pockets can be quickly detached by removing the bolts 11, so that different sized dial pockets may be substituted therefor, for different sized cans. A guide rail 13 carried by brackets 14 is so spaced relative to the feed dial and the feed pockets carried thereby, that the guiding rail holds the can closely in the guiding pocket, as it is carried across the stationary table.

As a means for rotating the feed dial, I have provided a Geneva stop wheel 15, which is mounted on a shaft 16 supported in a suitable bracket carried by the base of the machine. The gear 17 is mounted on the shaft 16, and engages the gear 7 secured to the feed dial. As a means for rotating the Geneva stop wheel, I have provided the usual rotating arm 18, carrying a roller 19, which engages the radial slots 20 in the Geneva wheel. The locking segment 21 is mounted on the shaft supporting the arm 18, and serves to hold the Geneva wheel and the feed dial from accidental movement during the periods when no movement is imparted to the Geneva wheel.

The shaft 22, which supports the arm 18, carries a beveled gear 23 at its lower end, which coöperates with a beveled gear on a shaft 24. The shaft 24 is driven, as herein shown, by a sprocket chain 25, which is operated by a spur wheel mounted on the shaft 26, which is rotatably mounted in the supporting frame carried at the upper end of the central post. The shaft 26 is rotated from the shaft 27, which in turn is operated by the main shaft 28.

It will thus be seen that I have provided a can closing mechanism which embodies a stationary table over which the cans are fed intermittently, and that the cans are held from movement at each operating station during the entire operation upon the can at said station.

As a means for feeding the cans to the intermittent dial feed, I have provided a conveyer belt 29, which runs over a suitable pulley 31, mounted in brackets depending from the lower surface of the supporting table. The shaft 22 is provided with a sprocket wheel 32, which is connected by means of a sprocket chain 33 with a similar sprocket wheel on the shaft 34, which is geared to the shaft 35, and said shaft 35 in turn is connected by a sprocket chain 36 to a sprocket wheel 37, on the shaft carrying the feed wheel 31. As the shaft 22 is rotated through its connecting train of mechanism with the main shaft 28, the feed wheel 31 will be in turn given a rotating movement through its connecting train of mechanism, with the shaft 22. The conveyer belt 29 runs over a suitable support 38, and the cans which rest on the conveyer belt are conveyed along with the belt between guiding rails 39, 40. As the cans approach the delivering end of the conveyer belt 29, they are engaged by the spacing arms 41, 42. The spacing arm 41 is pivoted to the table 3, and by means of a spring 43 is held so that the outer end of the arm 41 projects into the path of movement of the cans on the conveyer belt. The spacing arm 42 is also pivoted to the supporting table, and is held with its free end projecting into the path of movement of the cans, by means of a spring 44.

The spacing arms 41 and 42 are connected by a chain 45. The arm 42 is mounted on a short shaft 46, which has mounted on its lower end an arm 47, carrying a roller which coöperates with a cam 48 mounted on the shaft 22. As the shaft 22 rotates, the cam 48 will engage the roller on the arm 47, and move the spacing arm 42, so as to allow a can to pass. This movement of the spacing arm 42 through the chain 45 imparts a similar movement to the arm 41, so that this arm is withdrawn from the path of movement of the cans. The arms 41 and 42 are so located that the cans are held slightly spaced, so that they may be fed one at a time into the feed pockets carried by the rotating dial feed, without in any way jamming the cans. The guiding rail 39 is curved at its forward end, as shown at 49, so as to properly direct the can into the feed pocket.

Figure 3:
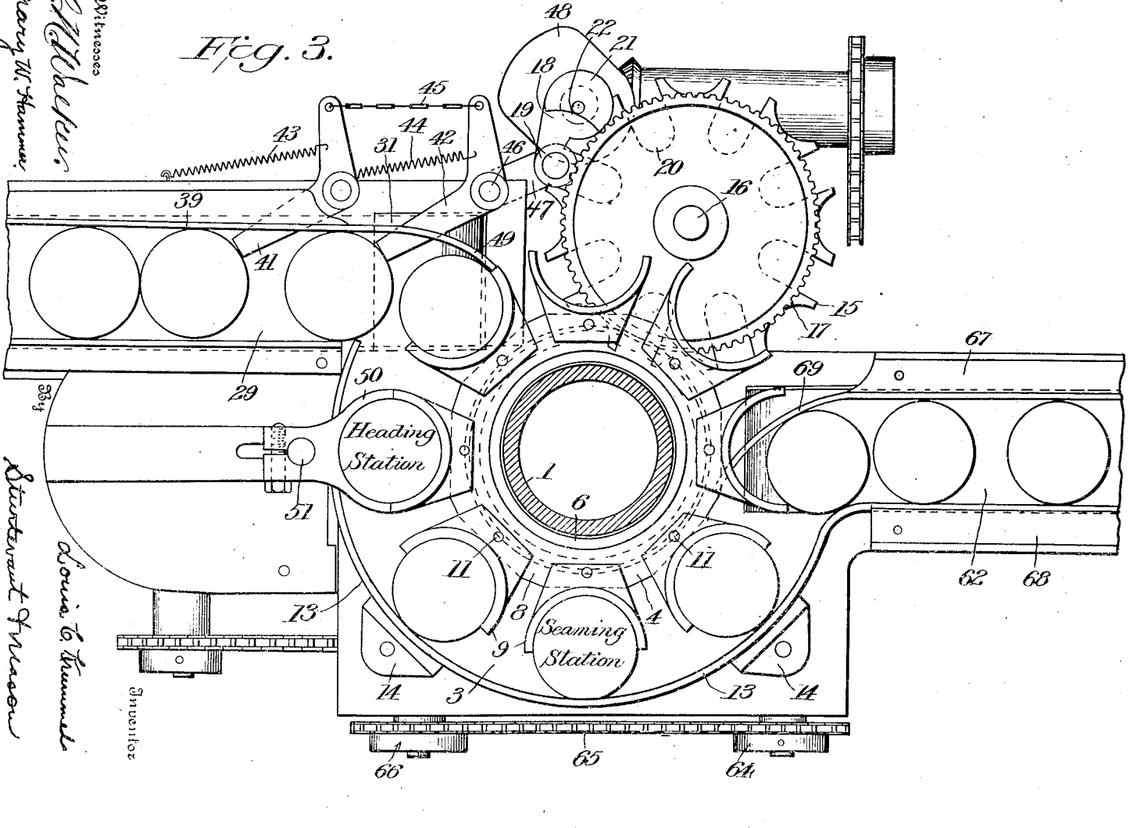
Fig. 3 is a horizontal sectional view through the supporting post, showing the feeding mechanism in plan, and the relation of the various operating stations to said central post.

The feed dial carrying the feed pockets is rotated intermittently, as above noted, and the spacing arms are so timed that the can is fed forward into the feed pocket when the feed dial is stationary. When the feed dial is given a feeding movement, the can is carried forward by the same. After the can has been delivered to the feed dial, it is carried first to the heading station, as shown in Fig. 3.

Figure 5:
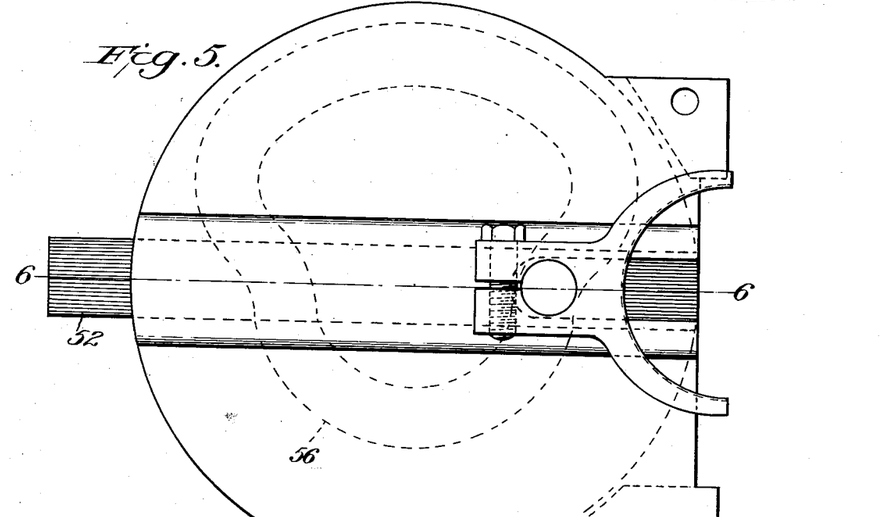
Fig. 5 is a detail view showing in plan, the guiding and cover plate for the shaping mold, operating upon the can at the heading station.
Figures 6, 7, 8:
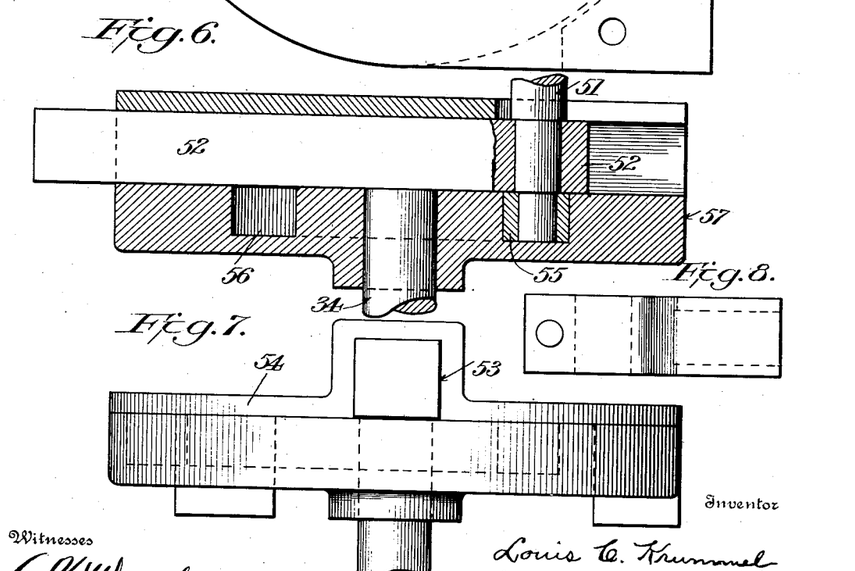
Fig. 6 is a sectional view on the line 6—6, of Fig. 5, with the half mold omitted.
Fig. 7 is an end view of the operating mechanism for the shaping mold.
Fig. 8 is a side view of the shaping mold, detached.

It often occurs that the can bodies in handling, become bent out of proper shape, so that the top or head will not readily fit into the same. The dial feed pockets, as above noted, are shaped so as to properly round up the can to receive the top or head. Coöperating with the dial feed pockets is a half mold 50, which is mounted on a supporting stud 51, (see Figs. 5, 6, 7 and 8). Said supporting stud 51 extends through a slide 52, which slide fits in a guideway 53, formed in a guiding bracket 54, which is suitably secured to the table 3. The stud 51 carries a roller 55, at its lower end, which engages a face cam 56, in a disk 57 mounted on the shaft 34. As the shaft 34 is rotated through the train of mechanism above described, the cam disk 57 will be rotated and will impart a reciprocating motion to the half mold 50. The operating cam 56, as shown in Fig. 5, is so shaped as to reciprocate the half mold or clamp 50, and give thereto a dwell at each end of its reciprocation. The half mold, therefore, will be moved forward into contact with the can, as soon as the movements of the feeding dial cease, by reason of the control of the Geneva stop wheel. The half mold 50 is so formed that it coöperates with the half mold or feeding pockets on the dial feed in rounding up the can to receive the top. After the can has been brought to the heading station and properly rounded up for the head or top, the head or top may be placed on the can by means of any suitable automatic cover feeding mechanism.

I have shown herein a magazine 58, in which the tops are placed, and these tops are fed one by one from the magazine, by means of a screw feed 59, operated by means of a sprocket chain 60, from an extension 61 of the shaft 22. The mechanism for placing the head or top on the can is, however, no part of the present invention, and it should be distinctly understood that any suitable heading mechanism may be used in place of the one herein shown. After the can has received its head or top, the dial feed carries the same along the stationary table. The feed, as herein shown, is so controlled, that the can, after leaving the heading station, is carried to an idle station. At this idle station the can may be inspected to see whether the same is in proper shape for the next operation upon the same. The next feeding movement of the feed dial carries the can underneath the seaming head, where it is held stationary upon the supporting table, without being revolved, lifted or moved in any other way during the entire seaming operation. This holding of the can stationary during the entire seaming operation is a great advantage, especially in closing filled cans, as it avoids the spilling of the contents, which often occurs where the cans are closed while under movement. After leaving the seaming station, the can, as herein shown, is carried to a second idle station, and upon the next feeding movement of the feed dial, the can is carried to a continuously moving conveyer belt 62, which takes the can away from the apparatus. The conveyer belt 62 runs on a suitable support, and is led over a feeding roller 63, mounted in suitable depending brackets carried by the table 3. The shaft which supports the feed roller 63, carries a sprocket wheel 64, which is connected by means of the chain 65 to a sprocket wheel 66, carried by the shaft which supports the feed wheel 31. The conveyer belt 62 runs underneath guiding rails 67, 68, between which the cans are guided. The rail 67 is curved, as shown at 69, so as to remove the can from the dial feed pocket, and carry it on to the conveyer belt.

Figure 12:
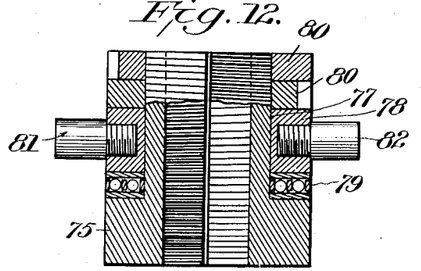
Fig. 12 is a sectional view of the same.
Figure 13:
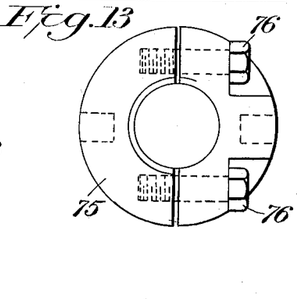
Fig. 13 is a bottom view of the same, with the projecting pins omitted.

The seaming head, as shown herein, is carried by a spindle or hollow shaft 70, which is mounted in brackets 71, 72, so as to rotate freely in said brackets, and to move endwise therein. A beveled gear wheel 73 is splined on to the spindle 70 and engages a beveled gear wheel 74 carried by the forward end of the shaft 27. As the shaft 27 is rotated by the main shaft 28, the spindle 70 will be rotated. The spindle 70 carries a collar or sleeve 75, which, as herein shown, (see Fig. 12), is made in two sections, which are threaded and engage corresponding threads on the outer face of the spindle 70. The two half sections of the collar 75 are connected by suitable bolts 76. When the bolts 76 are tightened, the half sections of the collar 75 are brought into gripping contact with the spindle 70, so that the collar 75 is firmly connected to said spindle. The collar 75 is provided with a reduced portion 77, on which loosely fits a ring 78. Ball bearings 79 are located between the ring 78 and the shoulder on the collar 75. The threaded locking nuts 80 engage the upper end of the collar 75, and serve as a means for holding the ring 78 on the collar 75, so that the collar may rotate freely within the ring 78. The ring 78 is provided with outwardly projecting studs 81, 82, which engage suitable sockets formed in the outer end of the lever 83. The lever 83 is mounted on a shaft 84, carried by the frame at the upper end of the supporting post 1.

Figure 9:
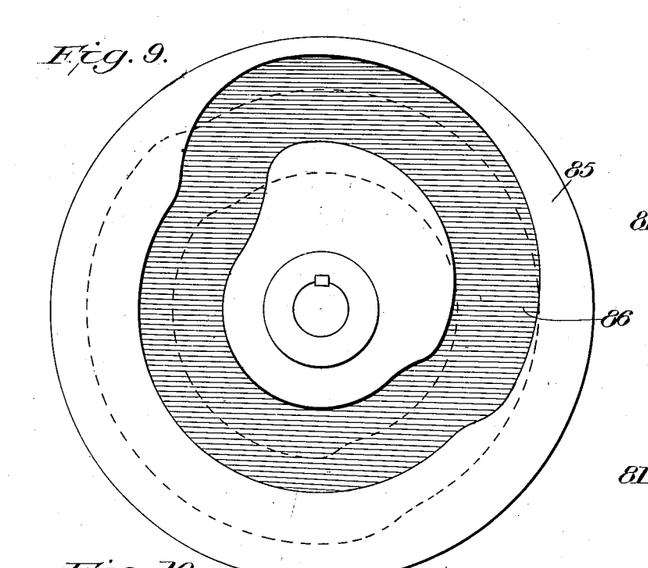
Fig. 9 is a side view of the cams for raising and lowering the seaming head and the center rod.
Figure 10:
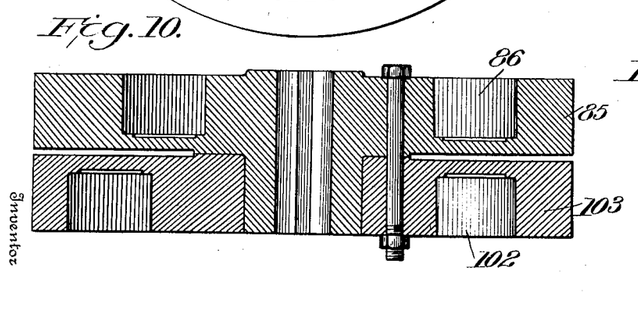
Fig. 10 is a sectional view of the same.
Figure 11:
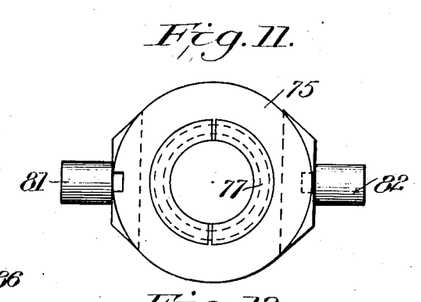
Fig. 11 is a top plan view of the connecting collar between the seaming head spindle and the lever which reciprocates the same.

As a means for vibrating the lever 83, so as to move the spindle 70 longitudinally, I have provided the shaft 26 with a cam disk 85. The cam disk 85 is provided with a face cam 86, (see Fig. 9), which receives a roll carried by an arm connected with the lever 83. As the cam disk 85 is rotated with the shaft 26, the cam groove therein will operate through the lever 83 to reciprocate the spindle 70 in its bearings. The spindle 70 carries at its lower end, the seaming head, which, as herein shown, comprises an inner sleeve 87, and an outer sleeve 88. The inner sleeve 87 is threaded on to the end of the spindle, so that the inner sleeve moves up and down with the spindle 70, and also rotates therewith. Said inner sleeve 87 is provided with a downwardly projecting portion, which fits a central socket or recess formed in the outer sleeve 88. The outer sleeve 88 is provided with pivoted levers 89 and 90. The lever 89 carries a seaming roll, which, as herein shown, is a curling roll, while the lever 90 carries a roll for flattening the seam. The outer sleeve 88 is provided with bolts 91, which extend up through the flange in the inner sleeve, and serve to limit the downward movement of the outer sleeve relative to the inner sleeve or the expanding movement of the seaming head. Suitable springs may be provided, if desired, to separate the inner and outer sleeves. The pivoted lever 89 is provided with a pivoted latch cam, which coöperates with a cam 92 carried by the inner sleeve. The pivoted lever 90 is provided with a cam plate, which coöperates with a cam 93, also carried by the inner sleeve. When the inner sleeve is moved into the outer sleeve, the cams carried thereby operate to swing the levers supporting the seaming rolls, into contact with the head or top of the can. The operating cams 92 and 93 are so formed that the curling roll is first moved into contact with the head of the can, after which it is released and moves slightly away from the head of the can, while the flattening roll performs its operation. A suitable spring 94 is provided for swinging the lever 90 and a similar spring is provided for swinging the lever 89, so that said levers are held in contact with their operating cams. The outer sleeve carries a chuck 95, which is threaded on to a chuck stem 96, so that the outer sleeve may rotate freely relative to said chuck, although the chuck is reciprocated with the outer sleeve. Suitable ball bearings are interposed between the chuck and the outer sleeve. Passing centrally through the spindle 70 and the outer and inner sleeves, is a center rod 97. Said center rod at its lower end carries a center pad 98, which is preferably so shaped as to fit a recess or cut-away portion in the lower face of the chuck 95. The center rod 97 is connected with the chuck stem 96 by means of a spline, so that the chuck stem and chuck may move longitudinally on the center rod, but are held from rotating thereon. The center rod near its upper end, is connected to a threaded collar 99, which is provided with studs engaging the outer end of a lever 100, pivoted on a short shaft 101, passing through the upper portion of the frame of the machine, and carrying a roll, which engages the cam groove 102, formed in a cam disk 103, which is bolted to the cam disk 85, so as to rotate therewith on the shaft 26.

The operation of my seaming head is as follows: The can is brought to the seaming station by the feeding dial and is held directly underneath the seaming head. The spindle 70 is continuously rotated at a very high speed. The cam groove 102 in the cam disk 103 is so shaped, that the center rod 97 carrying the center pad 98, is first lowered until said center pad engages the cover and holds the can lightly but firmly on the stationary supporting table. This movement of the center pad down on to the cover in advance of the seaming head serves to properly place or seat the cover on the can body, whereby a perfect joint may be made. The seaming head is then lowered by means of the cam groove 86 in the face of the cam disk 85, until the chuck engages a shoulder on the center pad, at which time the lower face of the chuck is substantially flush with the lower face of the center pad and the chuck is properly positioned on the cover or top of the can. Further downward movement of the outer sleeve is thus prevented by the center pad, and the inner sleeve continues its downward movement by the downward movement of the spindle 70, compressing the springs that may be interposed between the inner and outer sleeves. The curling roll 89 is first moved against the head of the can by the continued downward movement of the inner sleeve and the rotating movement of the seaming head causes the head or top of the can to be properly curled. A still further downward movement of the inner sleeve causes the lever 90 to bring the flattening roll into contact with the head of the can and finishes the closing operation. After the can has been closed, the spindle 70 begins its upward movement.

As the inner sleeve moves out of the outer sleeve, the seaming rolls are moved away from the head of the can. As soon, however, as the heads of the limiting bolts 91 contact with the upper face of the inner sleeve, then the outer sleeve and chuck carried thereby are moved upward away from the can. The cam groove for operating the center rod, is so constructed that the center rod still remains upon the can top until the outer sleeve and the chuck carried thereby, have moved away from the top of the can sufficiently to entirely release the can from the chuck.

It often occurs in the seaming operation that the can is clamped on to the chuck. The center rod in my seaming head will operate to eject the can from the seaming head, or rather will hold the can on the stationary table, until the seaming head has pulled away from the can. After the chuck has been released from the can, the center rod, together with the center pad, is then raised from the can. The seaming operation is now completed, and the feed dial operates to carry the closed can away from the seaming head and bring another can into place to be seamed. The center rod 97 is threaded into the collar 99, and by rotating the hand wheel 104, the center rod may be raised or lowered relative to the stationary table. This adjustment of the center rod is essential, so that the seaming head may be properly adjusted for different heights of the cans. After the center rod has been properly adjusted and brought down to its proper place on top of the can, the spindle 70 must also be adjusted longitudinally, so as to properly operate upon the cam to close the same. This adjustment of the spindle 70 is accomplished by loosening the nut 76, so that the collar 75 is released from its gripping contact on the spindle 70, and by rotating the spindle 70 or the collar 75, (which is threaded on to the same), the seaming head may be raised or lowered until it is properly positioned relative to the center rod.

Figures 15, 16, 17:
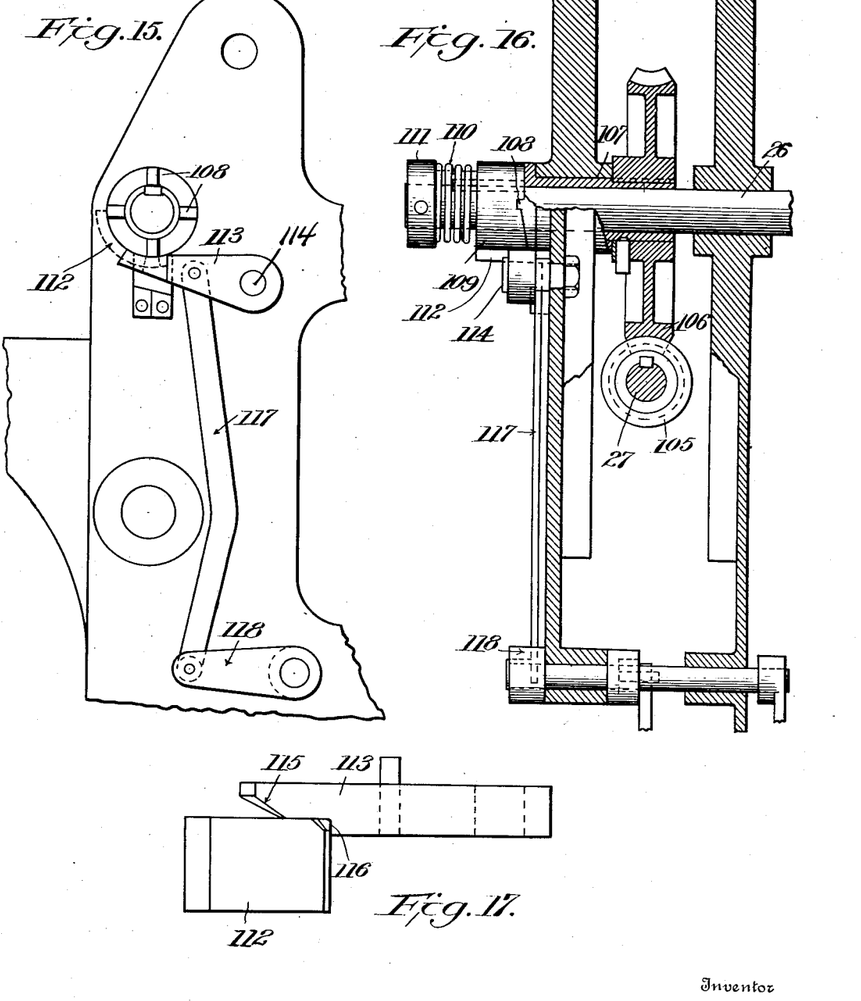
Fig. 15 is a side detail view, showing the operating clutch for stopping all the parts of the machine, except the rotating spindle.
Fig. 16 is a sectional view through the casing, showing the connection of the clutch to the driving worm.
Fig. 17 is a detail view, showing the clutch-shifting cam and its coöperating latch.
Figure 16:
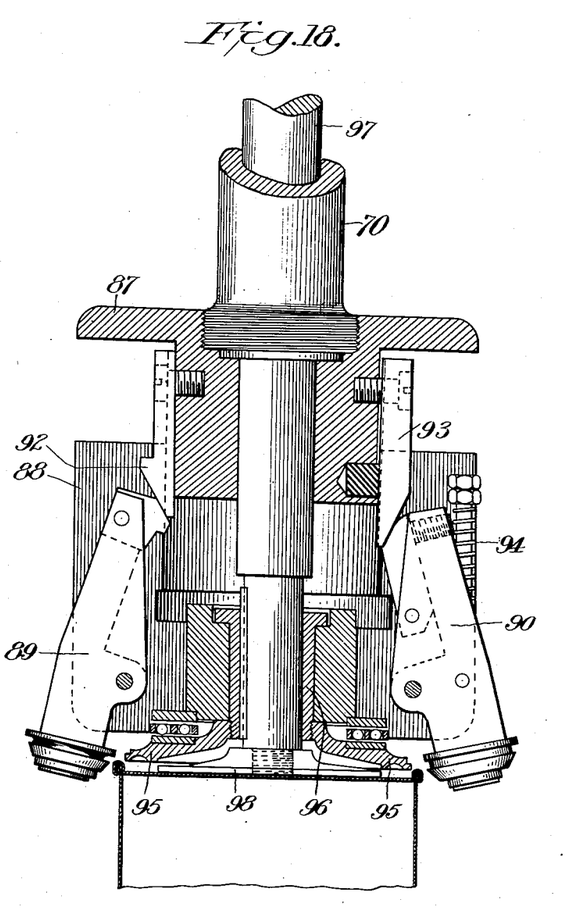

When a seaming head is rotated at a very high speed, as is necessary in order to perform quickly the closing operation, it has been found very undesirable to stop the rotation of the seaming head when it is desired to stop the apparatus for any reason. In order, therefore, to provide mechanism whereby the seaming head may rotate continuously, and the other parts of the machine be stopped, I have provided a clutch which is located intermediate the shaft 26 and the driving shaft 27, for rotating the spindle 70. As herein shown, the shaft 27 is provided with a worm 105, which engages a worm wheel 106, secured to a collar 107, which is mounted so as to rotate freely upon the shaft 26. The outer end of the sleeve 107 is provided with a jaw or clutch 108. A second sleeve 109 is splined to the shaft 26, so that it may slide longitudinally thereon, but cannot rotate relative thereto. The sleeve 109 is provided with a similar jaw or clutch, which coöperates with the jaw or clutch on the sleeve 108. A spring 110 is interposed between the sleeve 109 and a collar 111, secured to the outer end of the shaft 26. The sleeve 111 normally holds the clutch faces interlocked, so that the shaft 26 will rotate with the sleeve 107. The collar 109 is provided with a segmental cam plate 112. Coöperating with the cam plate 112 is a latch 113, which is carried by a pivot stud 114, mounted on the frame of the machine. The latch 113 is provided with a cam face 115, and with a shoulder 116. When the latch 113 is swung to the position shown in Fig. 15, and the shaft 26 is rotated, the cam plate 112 will engage the cam face 115, which will crowd the sleeve 109 longitudinally upon the shaft 26, so as to disengage the clutch. The cam plate 112 will strike against the shoulder 116, and prevent further movement of the shaft 26.

Inasmuch as the cam disks 85 and 103 are mounted on the shaft 26, and also the sprocket wheel which operates the conveyer belts and the feed dial are mounted on this shaft 26, the unclutching of the shaft 26 from the driving sleeve 107 will stop the feeding movements of the cams, the heading operation and the longitudinal movement of the spindle 70 and the center rod 97, but will allow the seaming head to continue its rotation, as the spindle 70 is connected directly to the shaft 26.

The latch 113 is connected by means of a link 117 to a rock arm 118, which may be provided with a handle, so disposed as to be conveniently operated by the operator. The rock arm 118, as herein shown, however, is connected by means of a link 119, with a treadle 120. By depressing the treadle 120, the latch cam 113 may be thrown down out of the path of movement of the cam plate 112, and the parts will then remain clutched together, so that the entire apparatus will continue its operation. If, however, the treadle is released, the latch 113 will move into the path of the cam plate 112, and as soon as the shaft 26 has made a single rotation, which completes a single seaming operation, said shaft 26 will be unclutched from the driving sleeve 102, and the entire apparatus, except the rotation of the seaming head, will cease.

While I have shown and described a specific form of double seaming head, it should be distinctly understood that this particular seaming head forms no part of the invention claimed herein, as any other form of seaming head may be substituted for the one herein shown, so long as the center rod and center pad carried thereby are used and operated to release the can from the seaming head in the manner herein stated.

Having thus described my invention, what I claim as new and desire to secure by Letters Patent, is:—

1. In an apparatus for closing cans, the combination with a central post, a stationary table supported by said post, a plurality of operating stations arranged concentrically about and supported by said posts and intermittently operated means for moving the cans on said stationary table from one operating station to another.

2. In an apparatus for closing cans, the combination with a central post, a stationary table supported by said post, a plurality of operating stations arranged concentrically about and supported by said posts, intermittently operated means for moving the cans on said stationary table from one operating station to another, and means for holding the cans still during the operation at each station.

3. In an apparatus for closing cans, the combination with a central post, a stationary table supported by said post, a plurality of operating stations arranged concentrically about and supported by said posts, intermittently operated means for moving the cans on said stationary table from one operating station to another, and means for feeding the cans one by one to said means for moving the cans on the stationary table.

4. In an apparatus for closing cans, the combination with a central post, a stationary table supported by said post, a plurality of operating stations arranged concentrically about and supported by said post, intermittently operated feeding means for moving the cans on said stationary table from one station to another, a continuously operated conveyer belt for delivering cans to said feeding mechanism, and spacing arms controlling the feed of the cans from the conveyer belt to the intermittently operated feeding mechanism.

5. In an apparatus for closing cans, the combination with a central post, a plurality of operating stations arranged concentrically about and supported by said post, a stationary table supported by said post on which the cans rest during each of said operations, a feeding mechanism supported by and moving concentrically about said post for moving said cans on said table, and means for intermittently operating said feeding mechanism, and for holding said feeding mechanism stationary during the operation at each station.

6. In an apparatus for closing cans, the combination of a central post, a plurality of operating stations, arranged concentrically about and supported by said post, a feeding mechanism supported by and moving concentrically about said post, and means for intermittently operating said feeding mechanism, and for holding said feeding mechanism stationary during the operation at each station.

7. In an apparatus for closing cans, the combination of a central post, a plurality of operating stations arranged concentrically about and supported by said post, a feeding mechanism supported by and moving concentrically about said post, means for intermittently operating said feeding mechanism, and for holding said feeding mechanism stationary during the operation at each station, a continuously operating delivery belt and means for spacing the cans and delivering the same one by one from the delivering belt to the intermittently operating feeding means.

8. In an apparatus for closing cans, the combination with a central post, of a plurality of operating stations arranged concentrically about and supported by said post, a stationary table on which the cans rest during each of said operations, a feed dial supported by said post and rotating about the same, feeding pockets carried by said dial, and means for intermittently operating said feed dial for moving the cans on said table, and for holding the same stationary during the operation at each station.

9. In an apparatus for closing cans, the combination with a central post, of a plurality of operating stations arranged concentrically about and supported by said post, a stationary table on which the cans rest during each of said operations, a feed dial supported by said post and rotating about the same, feeding pockets carried by said dial, means for intermittently operating said feed dial for moving the cans on said table, and for holding the same stationary during the operation at each station, and means for delivering cans to said feeding pockets when said dial is stationary.

10. In an apparatus for closing cans, the combination with a central post, of a plurality of operating stations arranged concentrically about and supported by said post, a stationary table on which the cans rest during each of said operations, a feed dial supported by said post and rotating about the same, feeding pockets carried by said dial, means for intermittently operating said feed dial for moving the cans on said table and for holding the same stationary during the operation at each station, a conveyer belt extending underneath said dial and guide rails coöperating with said conveyer belt and guiding the cans whereby the belt carries the cans into said pocket on the feed dial.

11. In an apparatus for closing cans, the combination with a central post, of a plurality of operating stations arranged concentrically about and supported by said post, a stationary table on which the cans rest during each of said operations, a feed dial supported by said post, and rotating about the same, feeding pockets carried by said dial, means for intermittently operating said feed dial for moving the cans on said table, and for holding the same stationary during the operation at each station, a conveyer belt extending underneath said dial, guide rails coöperating with said conveyer belt and guiding the cans, whereby the belt carries the cans into said pocket on the feed dial, and spacing arms for controlling the movement of the cans on the conveyer belt.

12. In an apparatus for closing cans, the combination of an operating station, of a stationary table for supporting the cans during the operation at said station, said table having its upper surface smooth and unbroken.

13. In an apparatus for closing cans, the combination with a plurality of operating stations, of a stationary table on which the cans may rest during the operation at each station, means for feeding the cans along said table, the upper surface of said table being smooth and unbroken.

14. In an apparatus for closing cans, the combination of a central post, of a feed dial supported by said central post, feed pockets carried by said feed dial, a stationary table on which the cans rest and along which they are moved by said feed dial, and a guide rail arranged concentrically with said post and operating to hold the cans in said feed pockets.

15. The combination of heading mechanism, a stationary table on which the cans rest during the heading operation, means for feeding the cans to the heading station including a shaping feed pocket and a shaping mold independent of the feeding means coöperating with said feed pocket to round up the cans for the head.

16. The combination of heading mechanism, a stationary table, feeding mechanism including a shaping feed pocket, to round up the cans for the head, a shaping mold independent of said feeding mechanism coöperating with said pocket, and means for reciprocating said shaping mold.

17. The combination with an intermittently operated feeding mechanism having a shaping pocket, of a shaping mold coöperating therewith, a slide carrying said shaping mold, a guideway in which said slide may reciprocate, and a cam for reciprocating said slide back and forth in said guideway.

18. In an apparatus for closing cans, the combination of a central post, a stationary table carried thereby, an intermittently operated feeding mechanism rotating about said post while moving the cans on said stationary table, a conveyer belt for delivering cans to said feeding mechanism, a conveyer belt for carrying the cans away from said feeding mechanism, a driving shaft, and means connected to said driving shaft for operating said conveyer belts and said intermittently operating feed mechanism.

19. In an apparatus for closing cans, the combination of intermittently operating feeding mechanism, of a conveyer belt conveying the cans to said feeding mechanism, of a plurality of spacing arms for spacing the cans and feeding the same one at a time to said feeding mechanism, means for connecting said spacing arms, one of said spacing arms having a second arm, a cam engaging said second arm for oscillating said spacing arms, and a spring for holding said second arm in contact with said cam.

20. The combination with a seaming head including seaming rolls, of a can support, means for giving said seaming head and can support a relative movement to bring the can into operative relation with the seaming head, means for rotating said head, and means for suspending the relative movement of the head and support, without stopping the rotation of the head.

21. The combination of a seaming head including seaming rolls, of a stationary table, means for reciprocating said head, so as to bring the same into operative relation with a can on said table, means for rotating said head, and means for suspending the reciprocating movement of the head without stopping the rotation of said head.

22. The combination of a seaming head including seaming rolls, a can support, means for giving said seaming head and can support a relative movement to bring the can into operative relation with the seaming table, means for rotating the seaming head, means for automatically feeding cans to said seaming head, and means for suspending the relative movement of the head and support and the feeding mechanism, without stopping the rotation of the head.

23. The combination with a seaming head including seaming rolls, of a stationary table, means for reciprocating said seaming head to bring the same into operative relation with a can on said table, means for automatically feeding cans to said seaming head, and means whereby said reciprocating movement of the head and said feeding mechanism may be stopped without stopping the rotation of the head.

24. The combination with a seaming head, of means for rotating said seaming head, a cam for reciprocating said seaming head, a shaft carrying said cam, a clutch for connecting said shaft to the means for rotating said seaming head, and means for releasing said clutch, whereby the reciprocation of the head may be stopped.

25. The combination with a seaming head, of means for rotating said seaming head, means for reciprocating said seaming head including a cam, a shaft carrying said cam, a sleeve on said shaft, means for gearing said sleeve to the means for rotating said seaming head, means whereby said sleeve may be clutched to the shaft for reciprocating said head, and means under the control of the operator for releasing said clutch.

26. The combination with a seaming head, of means for rotating said seaming head, means for reciprocating said seaming head including a cam, a shaft carrying said cam, a sleeve on said shaft, means for gearing said sleeve to the means for rotating said seaming head, means whereby said sleeve may be clutched to the shaft for reciprocating said head, means under the control of the operator for releasing said clutch, and means for automatically closing said clutch when released by the operator.

27. The combination of a seaming head, means for rotating said seaming head, means for reciprocating said seaming head including a cam, a shaft carrying said cam, a sleeve on said shaft, a gear carried by said sleeve, and operatively connected with a gear on the means for rotating said head, a clutch sleeve splined to said shaft, and engaging a clutch face on said sleeve, a cam plate carried by said clutch sleeve, and a cam latch coöperating with said cam plate to release the clutch, and means controlled by the operator for moving said cam latch.

28. The combination with a seaming head, of means for rotating said seaming head, means for reciprocating said seaming head, and means whereby the reciprocations of said head may be stopped at a predetermined point, without stopping the rotations of said head.

29. The combination of a seaming head, means for rotating said seaming head, means for reciprocating said seaming head, a clutch for connecting said rotating means to said reciprocating means, and automatic means under the control of the operator for releasing said clutch at a predetermined point in the reciprocation of said head.

30. The combination with a stationary table, of a seaming head, means for reciprocating said seaming head, whereby it is brought into operative relation with a can on said table, means for rotating said head, and means for stopping the reciprocating movement of said head when said head is in its extreme position away from said table.

31. The combination of a seaming head, a center pad, a support for a can, means for moving said seaming head toward and from said support, and means for positively reciprocating said center pad, said center pad operating means being timed to hold the can from vertical movement with the seaming head, whereby the can is stripped from the head.

32. The combination of a seaming head, means for reciprocating said seaming head, means for rotating said seaming head, a center pad, a center rod supporting said center pad, means for positively reciprocating said center rod, said center rod reciprocating means being timed to hold the can from movement with the seaming head, whereby the can is stripped from said head.

33. The combination with a stationary table, of a seaming head, means for reciprocating said seaming head, a center pad, a center rod carrying said center pad, means for positively reciprocating said center rod, said reciprocating means for the center rod being timed so that the can is held by the center pad on said table until after the seaming head has moved away from the can and is released therefrom.

34. The combination with a stationary table, of a seaming head, a center pad, and means for positively reciprocating said center pad in both directions.

35. The combination with a stationary table, of a seaming head, a center pad, means for reciprocating said center pad and limiting its downward movement, whereby the can may be held firmly but lightly upon said table.

36. The combination with a stationary table, of a seaming head, a center pad, means for reciprocating said center pad and limiting its downward movement, whereby the can may be held firmly but lightly upon said table, and means whereby the reciprocating position of the center rod may be adjusted.

37. The combination with a stationary table, of a seaming head, means for reciprocating said seaming head, a center rod, and means for reciprocating said center rod, a center pad carried by said center rod, means for adjusting the reciprocating position of said center rod, and means for adjusting the reciprocating position of said seaming head.

38. A can seaming mechanism including in combination, a vertical post, a stationary table carried thereby, a seaming head supported by said post, said seaming head including a rotating spindle, bearings supported by said post in which said spindle rotates, a lever carried by said post for reciprocating said spindle, a shaft for rotating said spindle, a cam coöperating with said lever for reciprocating said spindle, a cross shaft carrying said cam, a gear carried by said cross shaft, and means for operating said gear from said rotating means.

39. In an apparatus for closing cans, the combination of a seaming head, means for operating said seaming head, a center pad and means for bringing said center pad into contact with the cover in advance of the seaming head, whereby said cover is properly seated on the can body.

40. In an apparatus for closing cans, the combination of a seaming head, means for operating said seaming head, a center pad, and means for bringing said center pad into contact with the cover in advance of the seaming head for seating the cover and for holding said center pad on said cover until after the seaming head has completed its operation and moved away from the can, whereby said can is stripped from said seaming head.

41. In an apparatus for closing cans, a seaming head including a chuck, means for moving said chuck into engagement with the cover, a center pad, and means for moving said center pad into engagement with the cover in advance of the chuck, whereby said cover is properly seated on said can body.

42. In an apparatus for closing cans, a seaming head including a chuck, means for moving said chuck into engagement with the cover, a center pad, and means for moving said center pad into engagement with the cover in advance of the chuck, whereby said cover is properly seated on said can body, and for holding said center pad in engagement with said cover until after the chuck moves away from the can, whereby said can is stripped from the chuck.

In testimony whereof I affix my signature, in presence of two witnesses.

LOUIS C. KRUMMEL.

Witnesses:
EZRA E. POST,
GEORGE S. HULL.